(12) United States Patent
Koyanagi et al.

(10) Patent No.: US 7,546,496 B2
(45) Date of Patent: Jun. 9, 2009

(54) PACKET TRANSMISSION DEVICE AND PACKET TRANSMISSION METHOD

(75) Inventors: Toshinori Koyanagi, Kawasaki (JP); Hideo Sunaga, Yokohama (JP); Satoshi Nemoto, Yokohama (JP); Shigetoshi Nakai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 11/064,848

(22) Filed: Feb. 25, 2005

(65) Prior Publication Data

US 2006/0107188 A1 May 18, 2006

(30) Foreign Application Priority Data

Nov. 2, 2004 (JP) ............................. 2004-319027

(51) Int. Cl.
G01R 31/28 (2006.01)
G06K 11/00 (2006.01)
H03M 13/00 (2006.01)
G06F 7/02 (2006.01)
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. ........................... 714/712; 714/4; 714/776; 714/820; 370/241

(58) Field of Classification Search ....................... None
See application file for complete search history.

(56) References Cited

U.S. PATENT DOCUMENTS

| 5,500,860 | A  | * | 3/1996  | Perlman et al.   | 370/401 |
|-----------|----|---|---------|------------------|---------|
| 6,026,077 | A  | * | 2/2000  | Iwata            | 370/254 |
| 6,804,712 | B1 | * | 10/2004 | Kracht           | 709/223 |
| 7,035,202 | B2 | * | 4/2006  | Callon           | 370/216 |
| 7,058,730 | B2 | * | 6/2006  | Harbin           | 709/249 |
| 7,058,844 | B2 | * | 6/2006  | Wiley et al.     | 714/4   |
| 7,177,951 | B1 | * | 2/2007  | Dykeman et al.   | 709/249 |
| 2003/0117949 | A1 | * | 6/2003 | Moller et al.   | 370/219 |

(Continued)

FOREIGN PATENT DOCUMENTS

JP          3406246 B       3/1999

(Continued)

OTHER PUBLICATIONS

Japan "Abstract of Uplinkfast" Cisco Systems Inc. http://www.cisco.com/japanese/warp/public/3/jp/service/manuali/sw/cat60/65scg/chapter09/09_stp_enha.shtml.

*Primary Examiner*—Cynthia Britt
*Assistant Examiner*—Guerrier Merant
(74) *Attorney, Agent, or Firm*—Hanify & King, P.C.

(57) ABSTRACT

A packet transmission device that is connected to a plurality of communication lines, and transmits a packet received, includes a failure detecting unit that monitors a condition of the communication lines, and detects a failure in the communication lines; and a packet transmitting unit that transmits, when the failure detecting unit detects a failure in a communication line, and when a packet having a same transmission-destination address as an address corresponding to a port of the communication line in which the failure has been detected is received, the packet from all preset ports.

6 Claims, 8 Drawing Sheets

U.S. PATENT DOCUMENTS

| | | | |
|---|---|---|---|
| 2004/0114595 A1* | 6/2004 | Doukai | 370/389 |
| 2004/0252639 A1* | 12/2004 | Hunter et al. | 370/229 |
| 2005/0111350 A1* | 5/2005 | Kano | 370/216 |
| 2005/0152286 A1* | 7/2005 | Betts et al. | 370/255 |
| 2005/0160328 A1* | 7/2005 | Lesartre et al. | 714/48 |
| 2005/0243818 A1* | 11/2005 | Foglar et al. | 370/389 |
| 2006/0250951 A1* | 11/2006 | Ueda et al. | 370/217 |

FOREIGN PATENT DOCUMENTS

| | | |
|---|---|---|
| JP | 2985940 B | 10/1999 |

* cited by examiner

FIG.1

IN NORMAL OPERATION

AT OCCURRENCE OF FAULT

AT LINE RECOVERY

PORT DATA 400

| MAC ADDRESS | PORT | CUSTOMER ID | SEND PORT |
|---|---|---|---|
| DA1 | 1 | 1 | 2、3、4 |
| DA2 | 2 | 2 | 1、3、4 |
| DA3 | 2 | 3 | 1、3、4 |
| DA4 | 2 | 4 | 1、3、4 |
| ⋮ | ⋮ | ⋮ | ⋮ |

FIG.6

| JUDGMENT INFORMATION GENERATION LOGIC DATA 500 | | | | | |
|---|---|---|---|---|---|
| OUTPUT PORT INFORMATION | | FORCIBLE Flooding INSTRUCTION SIGNAL | OUTPUT Port JUDGMENT INFORMATION | | |
| Flooding INSTRUCTION SIGNAL | PortSIGNAL (for unicast) | | Unicast/broadcast IDENTIFICATION INFORMATION | Port SIGNAL (for unicast) | |
| 0(INSTRUCTION ABSENT) | Contents RAM VALUE | 0(INSTRUCTION ABSENT) | unicast | Contents RAM VALUE | |
| | | 1(INSTRUCTION PRESENT) | broadcast | — | |
| 1(INSTRUCTION PRESENT) | — | — | broadcast | — | |

"—" ; don't care

FIG.7

PACKET TRANSMISSION DEVICE AND PACKET TRANSMISSION METHOD

BACKGROUND OF THE INVENTION

1) Field of the Invention

The present invention relates to a packet transmission device and a packet transmission method that is connected with a plurality of communication lines and that transmits received packets, and more particularly, to a packet transmission device and a packet transmission method that can restart packet communications quickly, even when a failure occurs in a communication line in use.

2) Description of the Related Art

At present, packet communications are carried out by use of plural packet transmission devices. When there are plural transmission routes, packet transmission devices calculate costs of the respective transmission routes and select the most suitable transmission route, and use a communication line corresponding to the selected transmission route and thereby transmit packets to a destination.

Further, current packet transmission devices have various redundancy functions so as to improve reliability of packet communications, in preparation for instances of occurrence of a failure with communication lines and so forth.

For example, in a switch loaded with Uplinkfast function described in "Concept of Uplinkfast", Cisco Systems, Ltd., [on line], [searched on Sept. 29, 2004]. internet <URL: http://www.cisco.com/japanese/warp/public/3/jp/service/manual_j/sw/ca t60/65scg/chapter09/09_stp_enha.shtml>, when one port corresponding to a redundancy structured communication line, connected with a host switch, is set for forwarding, and the other port is set for blocking, at occurrence of a failure with the port (communication line) for forwarding, the port for blocking is changed for forwarding. Then, from this port that becomes newly for forwarding, a dummy multicast frame (DMF) where MAC addresses of all the terminals under control are send source MAC addresses is sent, and a learning table memorized in a switch (packet transmission device) at host side is corrected.

The learning table is a table where ports and addresses of a communication line are corresponded to one another, and addresses registered (entered) in the learning table and send destination addresses of received packets are compared, thereby a port from which received packets are sent is specified, and packets are sent out from the specified port.

Namely, in the Uplinkfast, a DMF is sent, and addresses corresponded to the port of communication line where a failure has occurred are corrected one by one so as to correspond to the port of normal communication line, thereafter, packet communications are restarted.

However, in such a conventional technology, at occurrence of a failure with a communication line, it is not possible to quickly restart packet communications, which has been a problem with the conventional technology.

At occurrence of a failure with a communication line in use, addresses corresponded to the port of the communication line concerned are corrected one by one, accordingly, packet communications cannot be restarted until a DMF is sent, and all the addresses are corrected so as to correspond to the port of normal communication line.

Further, in many instances, a large number of packets are sent from a port to various destinations, accordingly, at occurrence of a failure with communication line to the port, to correct a large number of addresses corresponded to the port concerned, it is necessary to send the DMF for many times, which has been a further serious problem with the conventional technology.

SUMMARY OF THE INVENTION

It is an object of the present invention to solve at least the above problems in the conventional technology.

A packet transmission device according to one aspect of the present invention, which is connected to a plurality of communication lines, and transmits a packet received, includes a failure detecting unit that monitors a condition of the communication lines, and detects a failure in the communication lines; and a packet transmitting unit that transmits, when the failure detecting unit detects a failure in a communication line, and when a packet having a same transmission-destination address as an address corresponding to a port of the communication line in which the failure has been detected is received, the packet from all preset ports.

A packet transmission method according to another aspect of the present invention, which is for transmitting a packet received via a plurality of communication lines, includes detecting a failure in the communication lines by monitoring a condition of the communication lines; and transmitting, when a failure is detected in a communication line, and when a packet having a same transmission-destination address as an address corresponding to a port of the communication line in which the failure has been detected is received, the packet from all preset ports.

The other objects, features, and advantages of the present invention are specifically set forth in or will become apparent from the following detailed description of the invention when read in conjunction with the accompanying drawings.

DETAILED DESCRIPTION

Exemplary embodiments according to the present invention will be explained in detail below with reference to the accompanying drawings.

Figure 1:
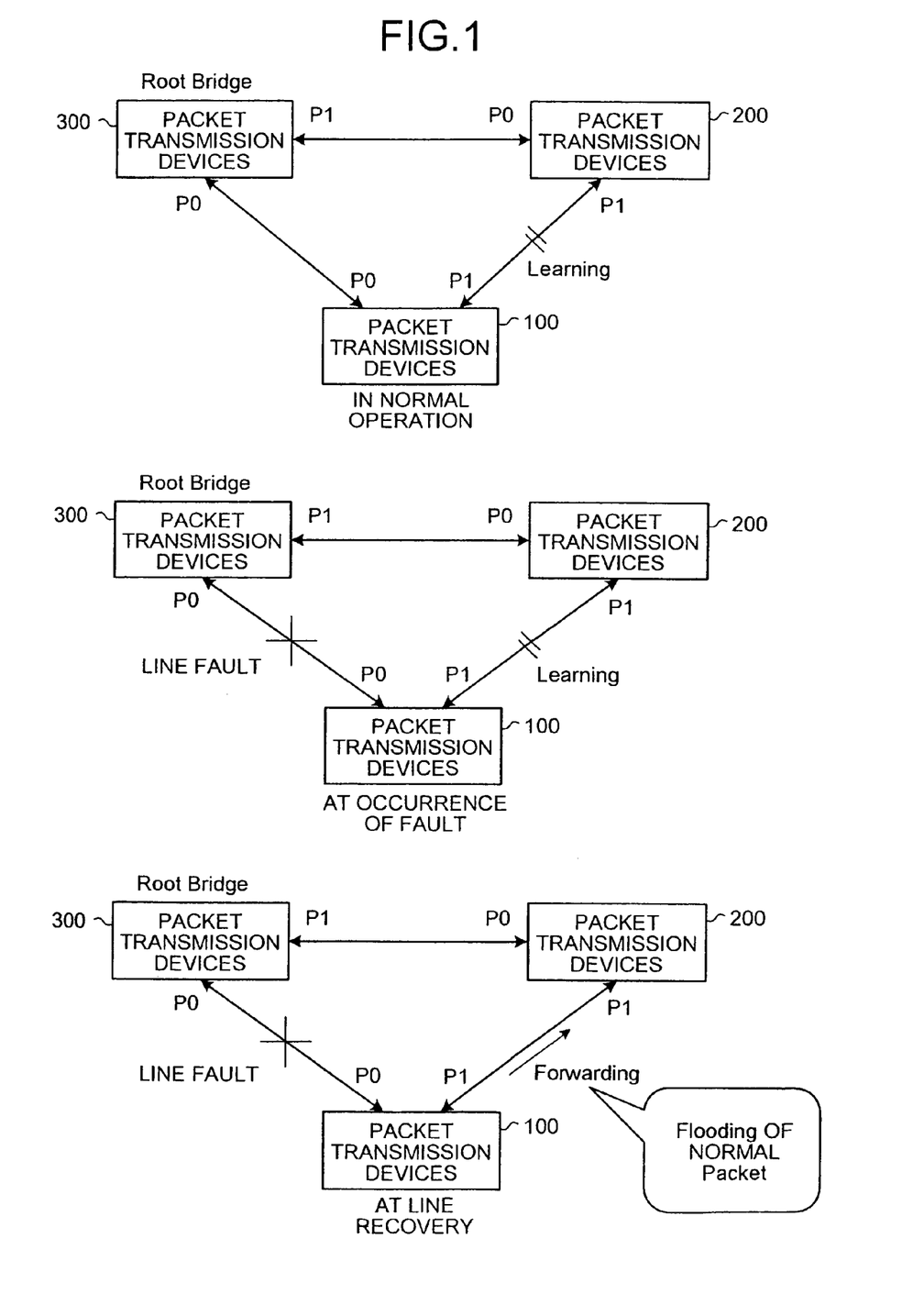
FIG. 1 is a schematic for explaining a concept of a packet transmission according to an embodiment of the present embodiment.

FIG. 1 is a schematic for explaining a concept of a packet transmission according to an embodiment of the present embodiment. As shown in the figure, packet transmission devices 100, 200, and 300 have ports P0 and P1, and are connected with one another via ports by communication lines.

For convenience of explanations, only three units of packet transmission devices 100, 200, and 300 each having two ports P0 and P1 are shown, meanwhile, each of the packet transmission devices 100, 200, and 300 has plural ports in addition to the ports P0 and P1, and is connected via the plural ports to plural packet transmission devices and the likes.

The packet transmission device 100 is connected to the packet transmission device 300 by use of the port P0, and connected to the packet transmission device 200 by use of the port P1. Further, the packet transmission device 200 is connected to the packet transmission device 300 by use of the port P0, and connected to the packet transmission device 100 by use of the port P1. Furthermore, the packet transmission device 300 is connected to the packet transmission device 100 by use of the port P0, and connected to the packet transmission device 200 by use of the port P1.

When the packet transmission device 100 sends a packet to the packet transmission device 200, there are one route where it directly sends the packet to packet transmission device 200, and the other route where it sends the packet via packet transmission device 300 to the packet transmission device 200.

For example, in normal condition, the packet transmission device 100 sends a packet via packet transmission device 300 to the packet transmission device 200, and makes the communication line of the route where it directly sends the packet to packet transmission device 200, as a spare communication line, and sets this communication line in Learning status.

The Learning status is a status where the packet transmission device 100 can send and receive a bridge protocol data unit (BPDU) as a control frame, but cannot sent a data frame (meanwhile, it can receive a data frame).

At occurrence of a failure in the communication line between the packet transmission device 100 and the packet transmission device 300, the packet transmission device 100 changes the communication line in the Learning status into Forwarding status, and outputs packets that are sent from the port where the failure has occurred from all the set ports set in prior. Herein, Forwarding status is a status where the packet transmission device 100 can send and receive the BPDU and the data frame.

In this manner, at occurrence of a failure with the communication line in use, the packet transmission device 100 sends received packets at once from all the set ports, without sending a DMF, and correcting addresses corresponded to the port of communication line where a failure has occurred one by one so as to correspond to the port of normal communication line, therefore, it is possible to quickly restart packet communications.

Figure 2:
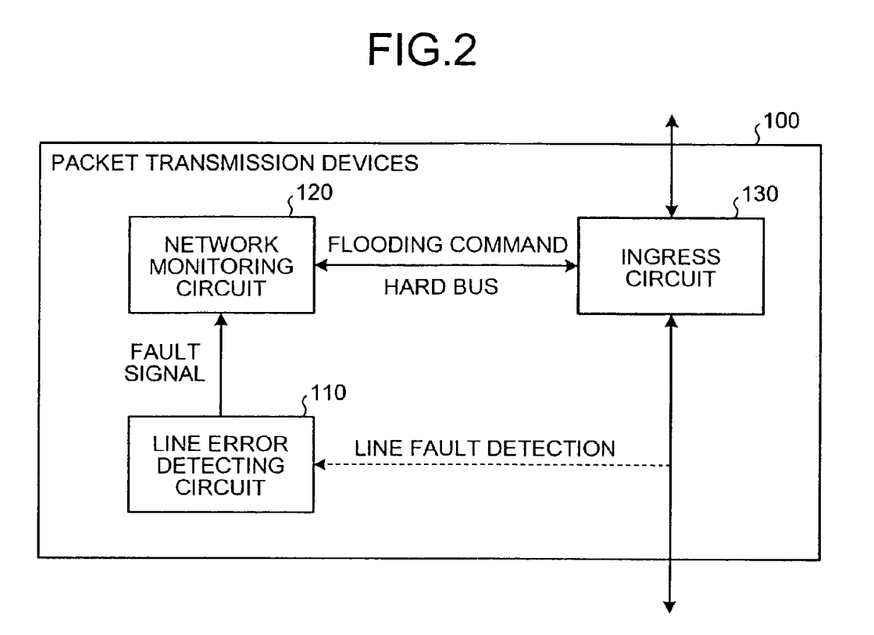
FIG. 2 is a block diagram of a structure of a packet transmission device according to the present embodiment.

FIG. 2 is a block diagram of a structure of the packet transmission device 100 according to the present embodiment. The packet transmission device 100 has a line error detecting circuit 110, a network monitoring circuit 120, and an Ingress circuit 130.

The line error detecting circuit 110 is a processing unit that monitors conditions of physical ports and communication lines and the likes, and at detection of a line failure, outputs a failure signal showing the occurrence of the line failure to the network monitoring circuit 120.

The network monitoring circuit 120 is a processing unit that outputs a flooding command to the Ingress circuit 130, when it receives the failure signal from the line error detecting circuit 110. Herein, flooding command is a command that makes the Ingress circuit 130 output packets received from all the set ports.

Figure 3:
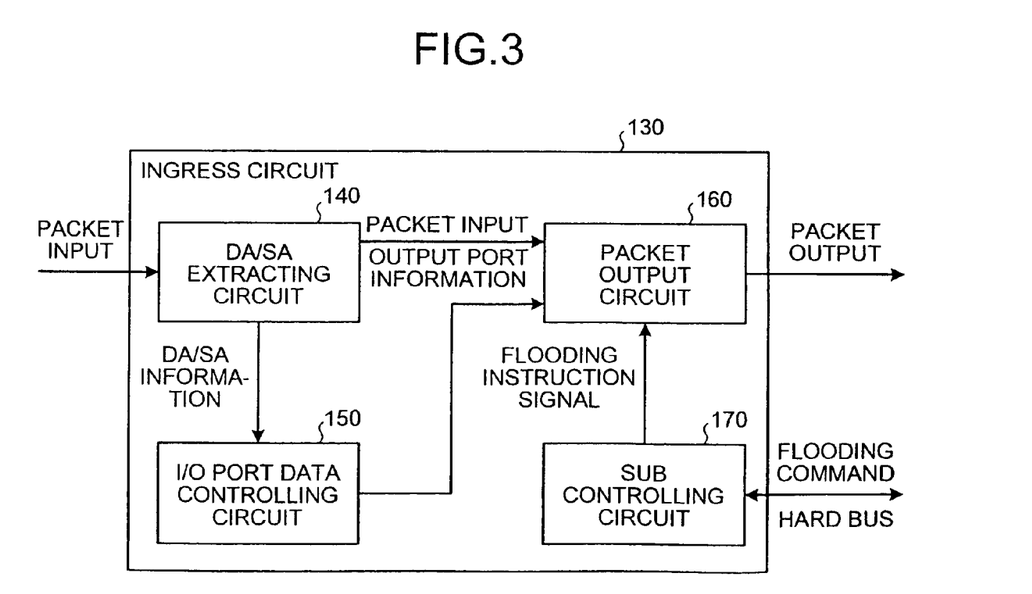
FIG. 3 is a block diagram of a structure of an Ingress circuit.

The Ingress circuit 130 is a processing unit that receives a packet from the outside, and judges a port from which the packet is to be output on the basis of information included in the received packet, and outputs the packet from the judged port. FIG. 3 is a block diagram of a structure of the Ingress circuit 130. The Ingress circuit 130 has a DA/SA extracting circuit 140, an I/O port data controlling circuit 150, a packet output circuit 160, and a sub controlling circuit 170.

The DA/SA extracting circuit 140 is a processing unit that acquires a packet, and outputs the acquired packet to the packet output circuit 160, and also extracts a destination address as a media access control (MAC) address of packet send destination, and a source address as a MAC address of send source from the acquired packet, and outputs the information of the extracted destination address and source address, as DA/SA information to the I/O port data controlling circuit 150. Hereinafter, destination address is referred to as DA, and source address as SA.

The I/O port data controlling circuit 150 is a processing unit that acquires the DA/SA information from the DA/SA extracting circuit 140, and on the basis of the acquired DA/SA information, generates information of port from which packets are to be output (hereinafter, "output port information"), and outputs the generated output port information to the packet output circuit 160.

The packet output circuit 160 is a processing unit that acquires the packet information from the DA/SA extracting circuit 140, and the output port information from the I/O port data controlling circuit 150 respectively, and on the basis of the acquired output port information, specifies a port from which packets are to be output, and outputs packets from the specified port.

Further, the packet output circuit 160 acquires a forced flooding instruction signal from the sub controlling circuit 170, and if it has information that flooding is to be executed, the packet output circuit outputs packets from all the set ports. Herein, the flooding instruction signal is a signal showing whether packets are to be forcibly output from all the set ports.

The sub controlling circuit 170 is a processing unit that, on acquiring a flooding command from the network monitoring unit 120, outputs the forced, flooding instruction signal to the packet output circuit 160. The sub controlling circuit 170 and the network monitoring unit 120 are connected by a hard bus.

Figure 4:
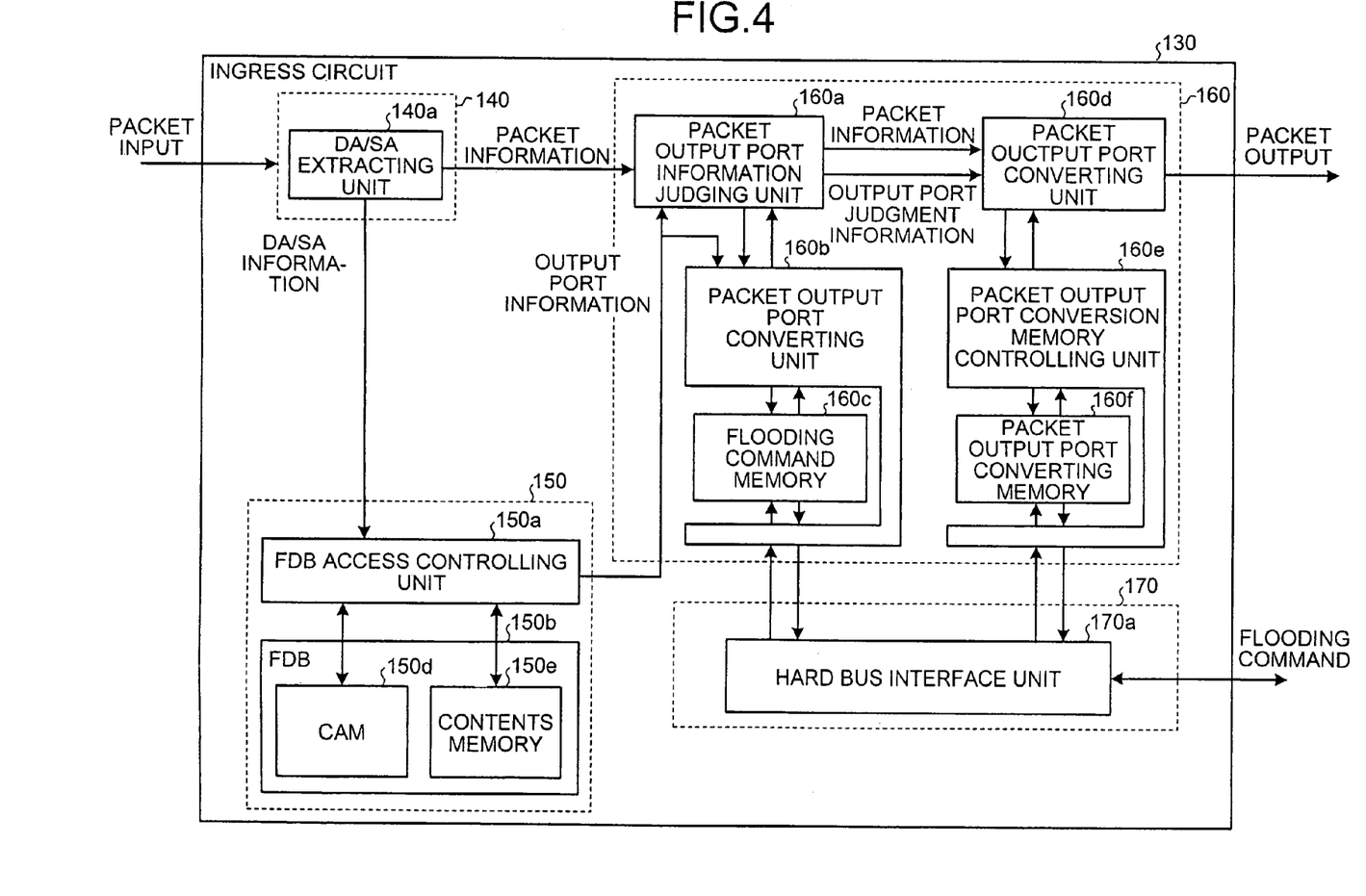
FIG. 4 is a block diagram for explaining the structure of the Ingress circuit shown in FIG. 3.

FIG. 4 is a block diagram for explaining the structure of the Ingress circuit 130 shown in FIG. 3. As shown in the figure, this Ingress circuit 130 has a DA/SA extracting unit 140*a*, a forwarding-database (FDB) access control unit 150*a*, an FDB 150*b*, a packet-output-port information judging unit 160*a*, a flooding command memory control unit 160*b*, a flooding command memory 160*c*, a packet output port converting unit 160*d*, a packet output port conversion memory control unit 160*e*, a packet output port converting memory 160*f*, and a hard bus interface unit 170*a*.

The DA/SA extracting unit 140*a* corresponds to the DA/SA extracting circuit 140 shown in FIG. 3. The explanation concerning the DA/SA extracting unit 140*a* is same as that concerning the DA/SA extracting circuit 140 shown in FIG. 3, therefore omitted herein.

The FDB access control unit 150*a* and the FDB 150*b* correspond to the I/O port data controlling circuit 150 shown in FIG. 3. The FDB 150*b* is a memorizing unit that memorizes information of output ports corresponding to DA, and has a contents-addressable memory (CAM) 150d, and a contents memory 150e.

The FDB access control unit 150a is a processing unit that acquires DA/SA information, and on the basis of the DA/SA information, acquires information of output ports corresponding to DA from the FDB 150b, and generates output port information by use of the acquired output port information, and outputs the generated output port information to the packet output circuit 160.

In concrete, FDB access control unit 150a generates a search key, on the basis of the acquired DA/SA information, and judges whether the generated search key exists in the CAM 150d in the FDB 150b. The CAM 150d is a memorizing unit that associates the search key corresponding to DA, with address information into which information of the output ports corresponding to the search key is memorized, and memorizes them.

When the search key that the FDB access control unit 150a has generated exists (hits) in the CAM 150d, the FDB access control unit 150a acquires the address corresponding to the search key that has hit from the CAM 150d, and on the basis of the acquired address, accesses the contents memory 150e.

Figure 5:
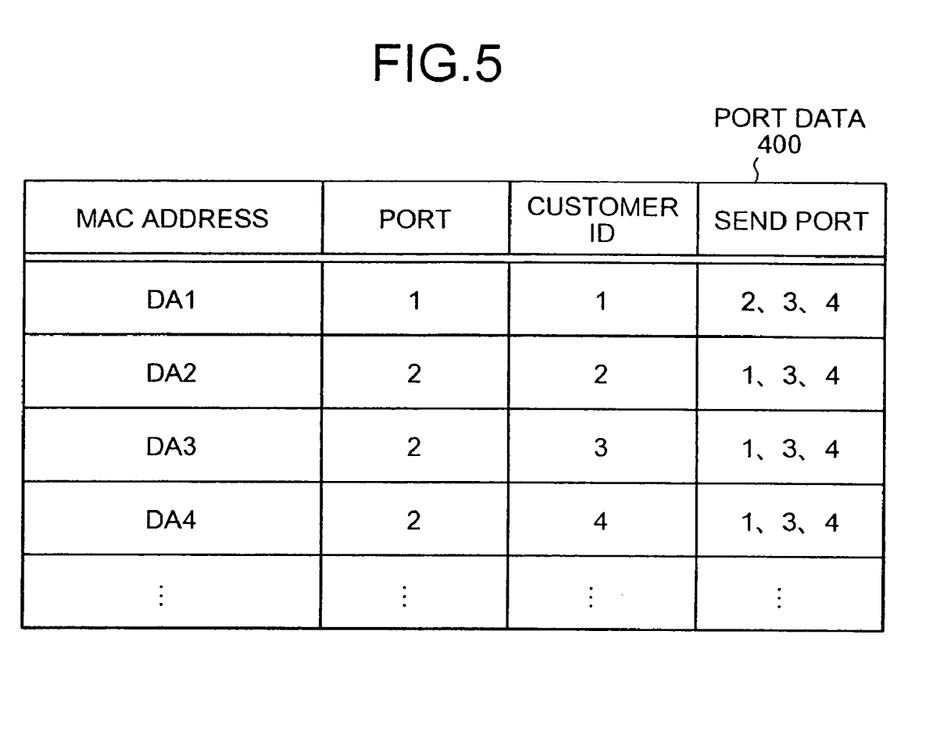
FIG. 5 is a table of an example of a data structure of port data stored in a contents memory.

The contents memory 150e is a memorizing unit that memorizes information of ports corresponding to DA and the like. FIG. 5 is a table of an example of a data structure of port data 400 stored in a contents memory 150. As shown in the figure, the port data 400 has a MAC address, a port, a customer identification (ID), and a send port.

The MAC address is a MAC address to DA, the port is information of the port to be used for sending received packets to DA, and the customer ID is information for identifying a customer corresponding to the MAC address, and the send port is information of ports available when corresponding port has a failure.

The port to the MAC address "DA1" is "1", the customer ID is "1", and the send port is "2, 3, 4". Further, the port to the MAC address "DA2" is "2", the customer ID is "2", and the send port is "1, 3, 4". Further, the port to the MAC address "DA3" is "2", the customer ID is "3", and the send port is "1, 3, 4". Further, the port to the MAC address "DA4" is "2", the customer ID is "4", and the send port is "1, 3, 4". Each item of information memorized in the contents memory 150e may be uniquely specified by addresses memorized in the CAM 150.

Referring back to FIG. 4, the FDB access control unit 150a, on the basis of the address acquired from the CAM 150d, acquires information of corresponding port, and generates output port information from the acquired port information, and outputs the generated output port information to the packet output circuit 160. This output port information has a flooding instruction signal and port information.

The flooding instruction signal is information whether to carry out flooding. When the flooding instruction signal is "0", flooding is not carried out, and when the flooding instruction signal is "1", flooding is carried out.

The FDB access control unit 150a sets the flooding signal to "0" when the generated search key hits the search key of the CAM 150d, meanwhile it sets the flooding signal to "1" when the generated search key does not hit.

Further, the FDB access control unit 150a sets the information of port acquired from the contents memory 150e as port information. When the search key does not hit, the port information becomes "don't care".

At occurrence of a failure with a communication line, the FDB access control unit 150a corrects the port data 400 memorized in the contents memory 150e. In concrete, it deletes the information of the port corresponding to the communication line where the failure has occurred, and sets new port information by receiving packets.

By referring to FIG. 5, for example, when a failure has occurred in the communication line of the port "1", the FDB access control unit deletes this "1", and sets a newly found port. For example, when a packet whose MAC address SA is "DA12 is received from the port "3", it sets "3".

Referring back to FIG. 4, the packet-output-port information judging unit 160a, the flooding command memory control unit 160b, the flooding command memory 160c, the packet output port conversion memory control unit 160e, and the packet output port converting memory 160f correspond to the packet output circuit 160 shown in FIG. 3.

The packet-output-port information judging unit 160a is a processing unit that acquires a packet, and the output port information, and on the basis of the output port information, generates output port judgment information, and outputs the generated output port judgment information and the packet information to the packet output port converting unit 160d.

The output port judgment information is information for specifying a port from which packets are to be output, and has unicast/broadcast identification information, and port information. The unicast/broadcast identification information is information for judging whether to output packets to only the port specified by the port information (unicast), or to output packets to all the set ports (broadcast). The port information is same as the port information explained concerning the port data 400, therefore omitted herein.

The unicast/broadcast identification information and the port information are generated on the basis of a judgment-information-generation logic data 500 explained hereinafter. This judgment-information-generation logic data 500 is held by the packet-output-port information judging unit 160a.

Figure 6:
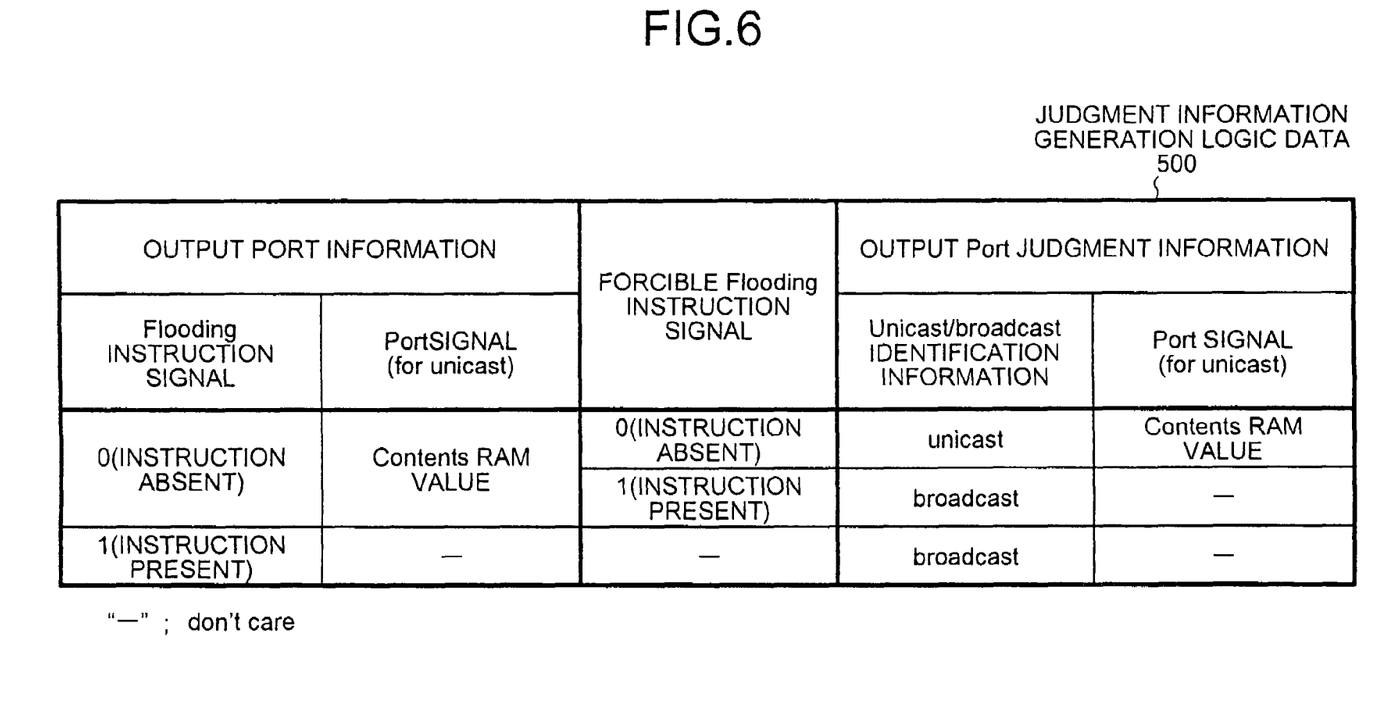
FIG. 6 is a table of an example of a data structure of judgment-information-generation logic data.

FIG. 6 is a table of an example of a data structure of judgment-information-generation logic data 500. The judgment-information-generation logic data 500 comprises output port information, a forcible flooding instruction signal, and output port judgment information.

The forcible flooding instruction signal is information whether to forcibly carry out flooding. When the forcible flooding information is "0", flooding is not carried out, and when the forcible flooding information is "1", flooding is carried out. When the flooding instruction signal of the output port information is set to "1", flooding is carried out, irrespective of the forcible flooding instruction signal.

When the flooding instruction signal of the output port information is "0", and the port information is "contents RAM value", and the forcible flooding instruction signal is "0", the packet-output-port information judging unit 160a generates output port judgment information where the unicast/broadcast identification information is set to "unicast", and the port information is set to the "contents RAM value" included in the output port information.

Meanwhile, when the flooding instruction signal of the output port information is "0", and the port information is "contents RAM value", and the forcible flooding instruction signal is "1", the packet-output-port information judging unit 160a generates output port judgment information where the unicast/broadcast identification information is set to "broadcast", and the port information is set to the "don't care" included in the output port information.

Further, when the flooding instruction signal of the output port information is "1", the packet-output-port information judging unit 160a generates output port judgment information where the unicast/broadcast identification information is set to "broadcast", and the port information is set to the "don't care" included in the output port information.

The packet-output-port information judging unit 160a acquires the forcible flooding instruction signal, by accessing the flooding command memory control unit 160b.

The flooding command memory control unit 160b is a processing unit that controls the information of the flooding command memory 160c, and when accepting an access concerning the forcible flooding instruction signal from the packet-output-port information judging unit 160a, acquires the forcible flooding instruction signal memorized in the flooding memory 160c, and outputs the acquired forcible flooding instruction signal to the packet-output-port information judging unit 160a. Herein, the flooding command memory 160c is a memorizing unit that memorizes forcible flooding instruction signals.

Further, when the flooding command memory control unit 160b acquires a forcible flooding instruction signal from the sub controlling circuit 170, it sets the forcible flooding instruction signal of the flooding command memory 160c to "1".

The packet output port converting unit 160d is a processing unit that acquires packet information and output port judgment information from the packet-output-port information judging unit 160a, and on the basis of the acquired output port judgment information, specifies a port from which packets are to be output, and outputs packets from the specified port.

When the unicast/broadcast identification information included in the output port judgment information is "unicast", the packet output port converting unit 160d outputs packets from the port specified by the "contents RAM value" stored in port information.

Further, when the unicast/broadcast identification information included in the output port judgment information is "broadcast", the packet output port converting unit 160d, to acquire port information for broadcast, accesses the packet output port conversion memory control unit 160e, and acquires the port information for broadcast. By using this port information for broadcast, it is possible to output received packets from all the set ports.

The packet output port conversion memory control unit 160e is a processing unit that controls the packet output port converting memory 160f, and on accepting an access from the packet output port converting unit 160d, acquires the port information for broadcast memorized in the packet output port converting memory 160f, and outputs the acquired port information for broadcast to the packet output port converting unit 160d. Herein, the packet output port converting memory 160f is a memorizing unit that memorizes the port information for broadcast.

Further, when the packet output port conversion memory unit 160e acquires information that the port information for broadcast is to be changed from the sub controlling circuit 170, it updates the port information for broadcast memorized in the packet output conversion memory.

The hard bus interface unit 170a corresponds to the sub controlling circuit 170 shown in FIG. 3. The hard bus interface unit 170a is a processing unit that outputs a flooding instruction signal to the flooding command memory control unit 160b, when it acquires a flooding command from the network monitoring circuit 120.

Further, when the hard bus interface unit 170a acquires the port information for broadcast from the network monitoring circuit 120, it outputs the acquired port information for broadcast to the packet output port conversion memory control unit 160e.

Figure 7:
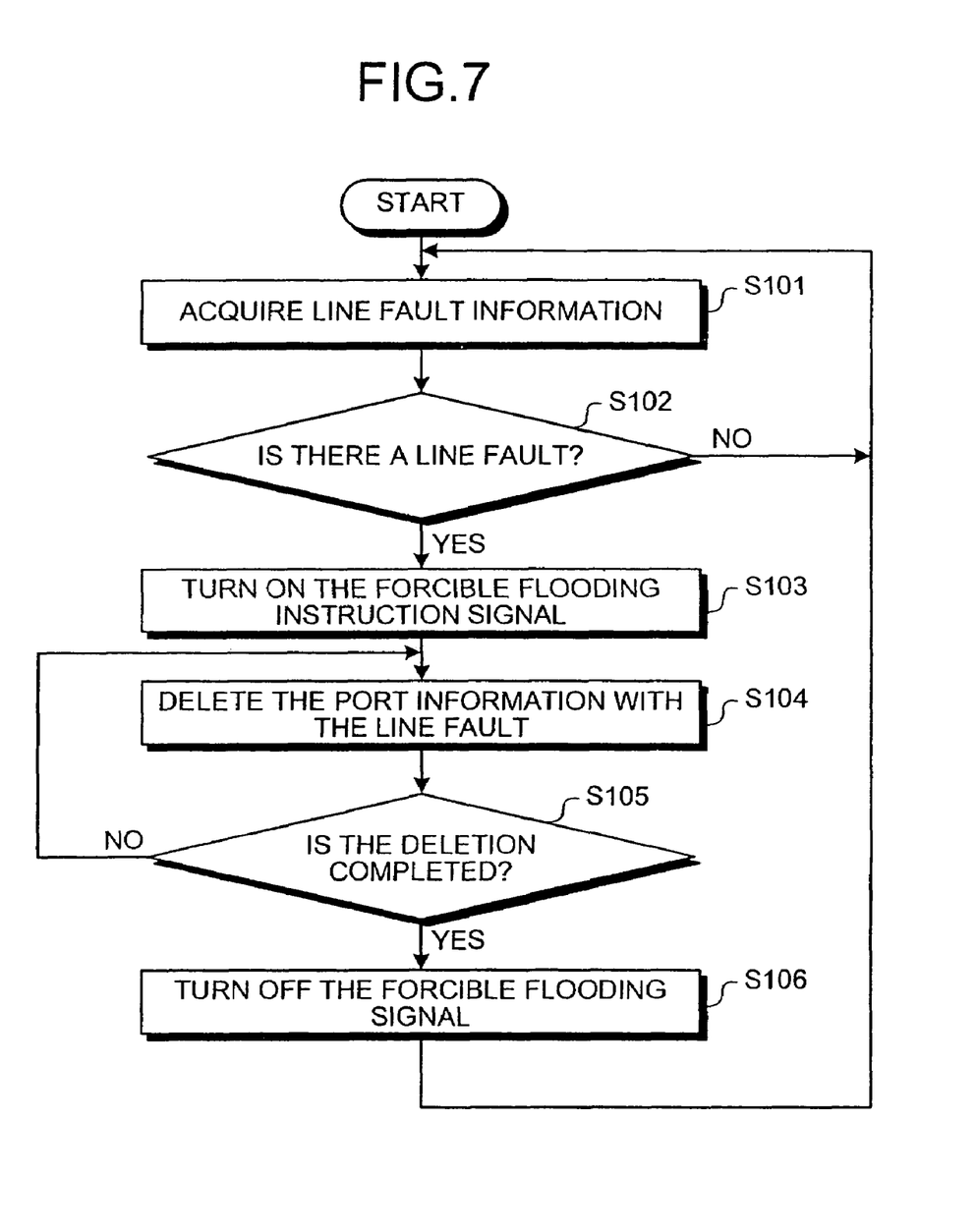
FIG. 7 is a flowchart of a process procedure for a case when a packet transmission device detects a line failure.

FIG. 7 is a flowchart of a process procedure for a case when a packet transmission device 100 detects a line failure. A line error detecting circuit 110 acquires line failure information (step S101), and when there is not a line failure (step S102, No), the procedure shifts to the step S101.

On the other hand, when there is a line failure (step S102, yes), the Ingress circuit 130 turns on the forcible flooding instruction signal (sets the forcible flooding signal of the flooding command memory 160c to "1") (step S103), and deletes the port information with the line failure (information of "port" of the port data 400) (step S104). For example, when a line failure occurs with the port "2", it deletes this "2".

Thereafter, when the deletion is completed (step S105, Yes), it turns off the forcible flooding signal (sets the forcible flooding signal of the flooding command memory 160c to "0") (step S106), and the procedure shifts to the step S101. On the other hand, when the deletion is not completed (step S105, No), the procedure shifts to the step S104.

Figure 8:
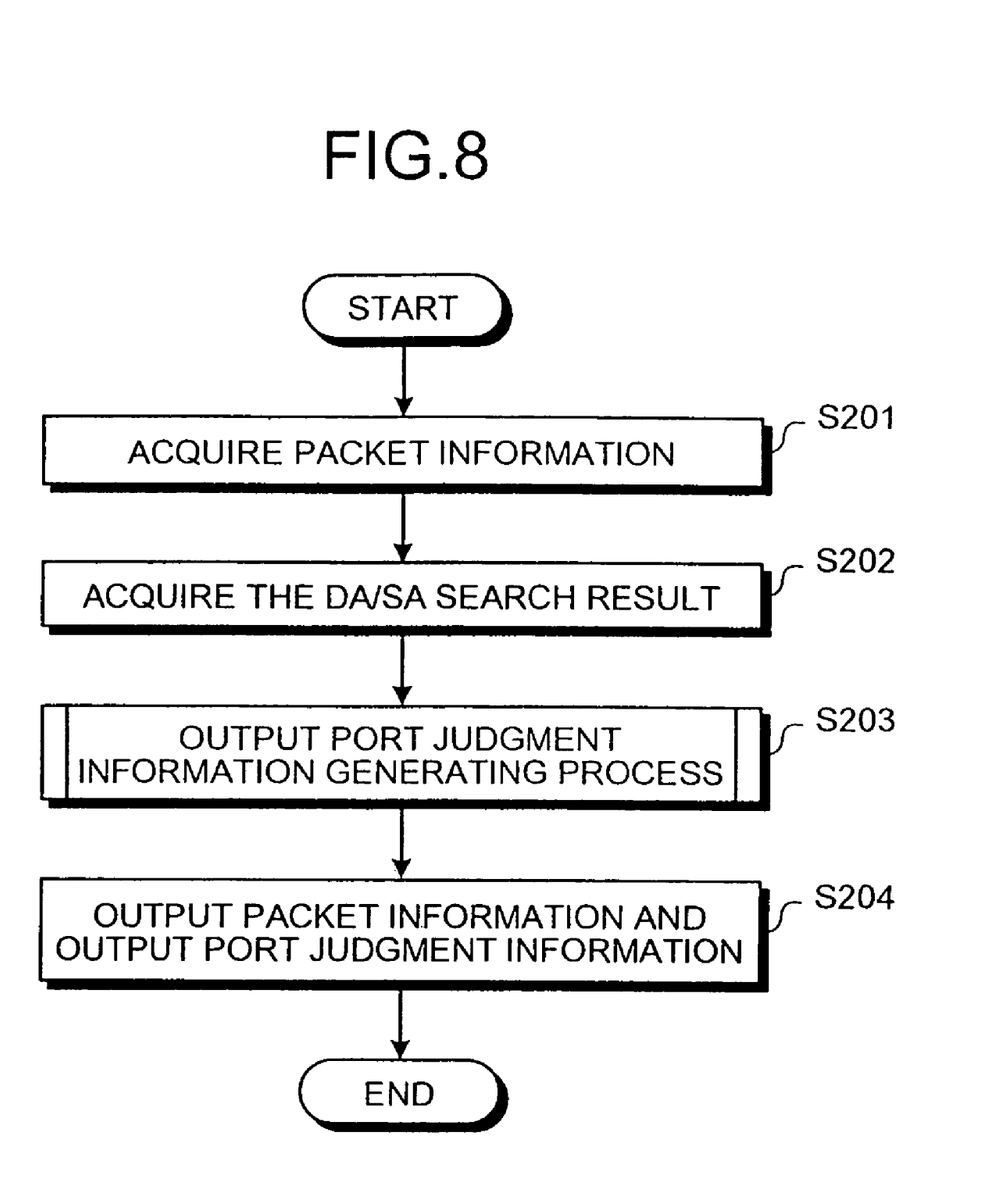
FIG. 8 is a flowchart of a process procedure for a packet-output-port information judging unit.

FIG. 8 is a flowchart of a process procedure for a packet-output-port information judging unit 160a. The packet-output-port information judging unit 160a acquires packet information (step S201), and acquires the DA/SA search result (step S202).

Further, the packet-output-port information judging unit 160a carries out an output-port-judgment-information generating process (step S203), and outputs packet information and output port judgment information to the packet output port converting unit 160d (step S204).

Figure 9:
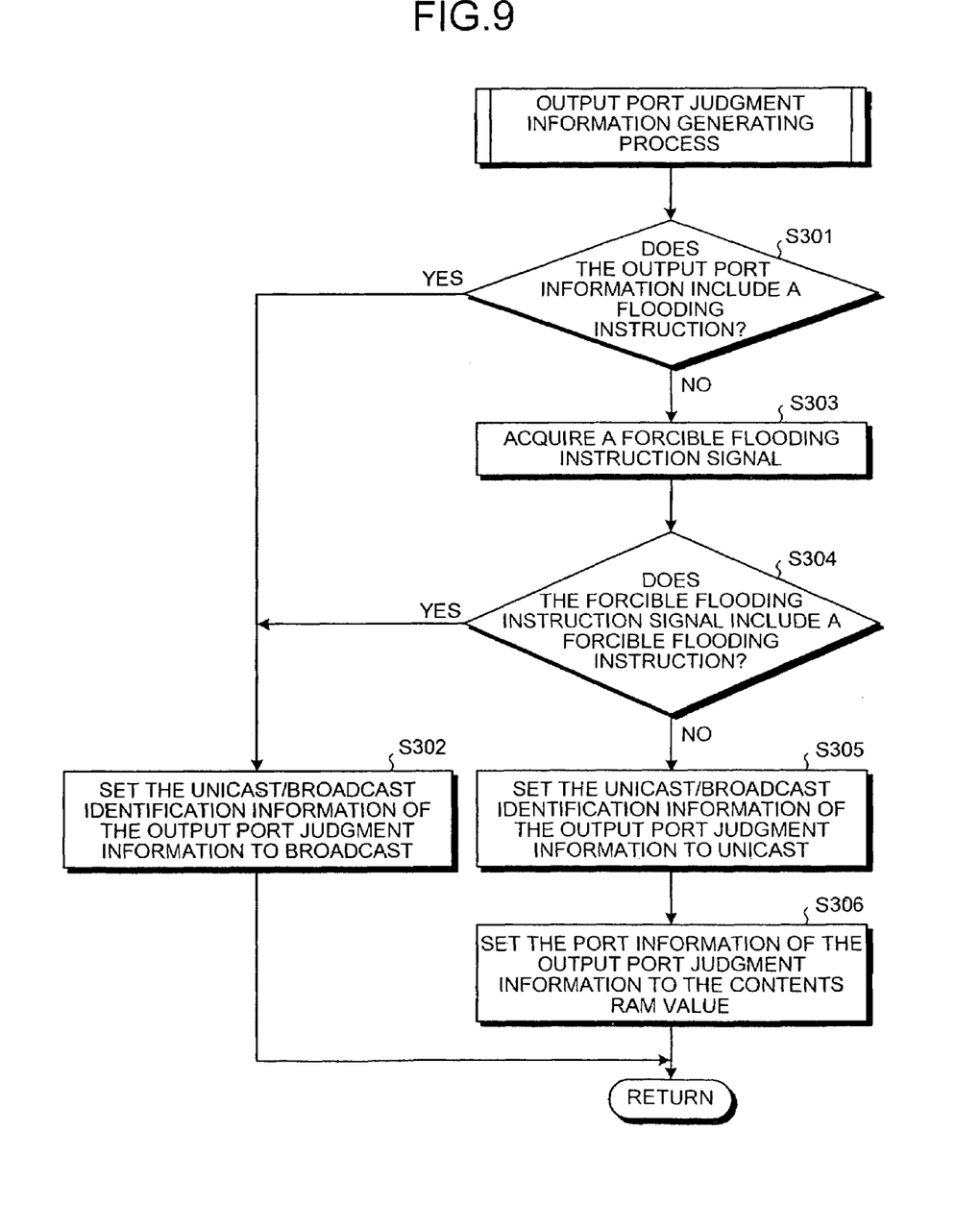
FIG. 9 is a flowchart of a process procedure for an output-port-judgment-information generating process shown in step S203 in FIG. 8.

FIG. 9 is a flowchart of a process procedure for an output-port-judgment-information generating process shown in step S203 in FIG. 8. The packet-output-port information judging unit 160a judges whether the output port information includes a flooding instruction (whether the flooding instruction signal is "1" or "0") (step S301), and when the output port information includes a flooding instruction (the flooding instruction signal is "1") (step S301, Yes), it sets the unicast/broadcast identification information to broadcast (step S302).

When the output port information does not include a flooding instruction (the flooding instruction signal is "0") (step S301, No), the packet-output-port information judging unit 160a acquires a forcible flooding instruction signal (step S303), and judges whether the forcible flooding instruction signal includes a forcible flooding instruction (whether the forcible flooding instruction signal is "1" or "0") (step S304), and when the forcible flooding instruction signal includes a forcible flooding instruction (when the forcible flooding instruction signal is "1") (step S304, Yes), the procedure shifts to the step S302.

On the other hand, when the forcible flooding instruction signal does not include a forcible flooding instruction (when the forcible flooding instruction signal is "0") (step S304, No), the packet-output-port information judging unit 160a sets the unicast/broadcast identification information of the output port judgment information to unicast (step S305), and sets the port information of the output port judgment information to the contents RAM value (step S306).

In this manner, the packet-output-port information judging unit 160a acquires the forcible flooding instruction signal, and when the forcible flooding instruction is included, it sets the unicast/broadcast identification information of the output port judgment information to broadcast; as a consequence, it is possible to quickly send packets to destinations.

As explained above, in the packet transmission device 100 according to the present embodiment, the packet output circuit 160 acquires packet information from the DA/SA extracting circuit 140, and acquires output port information from the I/O port data controlling circuit 150, and sends out packets from the port specified by the output port information. Further, at occurrence of a communication failure with a communication line, the packet output circuit 160 accepts a flooding instruction signal from the sub controlling circuit 170, and sends out received packets from all the set ports, set for broadcast recorded in the packet output port converting memory 160f, as a consequence, it is possible to quickly send received packets to destinations, without sending a DMF.

Furthermore, because there is no need to send a DMF at occurrence of a failure with a communication line, as in the conventional technology, it is possible to efficiently use the line bandwidth.

According to the present invention, a packet transmission device monitors conditions of communication lines, and detects a failure with a communication line, and when it receives a packet having the same send destination address as the address corresponded to the port of the communication line where the failure has been detected, it sends the received packet from all the set ports, therefore, even at occurrence of a failure with a communication line, it is possible to quickly restart packet communications.

Furthermore, according to the present invention, at detection of a failure with a communication line, a packet transmission device generates a flooding command as information that it sends out packet from all the set ports, and memorizes the generated flooding command. When such a packet transmission device receives a packet having the same send destination address as the address corresponded to the port of the communication line where the failure has been detected, if a flooding command is memorized, it sends the received packet from all the set ports, therefore, even at occurrence of a failure with a communication line, it is possible to restart packet communications, without wasting the line bandwidth.

Moreover, according to the present invention, at occurrence of a failure with a communication line, a packet transmission device corrects the address corresponded to the port where the failure has occurred so as to correspond to a normal port, therefore, it is possible to efficiently restart packet communications after occurrence of a failure with a communication line.

Furthermore, according to the present invention, when the port from which the received packet is to be sent is not clear, a packet transmission device sends the packet from all the ports, whether a flooding command is present or absent, therefore, even at occurrence of a failure with a communication line, it is possible to efficiently restart packet communications.

Moreover, according to the present invention, a packet transmission method monitors conditions of communication lines, and detects a failure with a communication line, and when it receives a packet having the same send destination address as the address corresponded to the port of the communication line where the failure has been detected, it sends the received packet from all the set ports, therefore, even at occurrence of a failure with a communication line, it is possible to quickly restart packet communications.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A packet transmission device that is connected to a plurality of communication lines, and transmits a packet received, the packet transmission device comprising:
   a failure detecting unit that monitors a condition of the communication lines, and detects a failure in the communication lines;
   a packet receiving unit that receives a packet having a same transmission-destination address as an address corresponding to a failure port of a communication line in which the failure has been detected;
   a command generating unit that generates, when the failure detecting unit detects the failure in the communication line, a flooding command indicating that the received packet is to be sent from all the ports;
   a storing unit that stores the flooding command;
   a deleting unit that deletes, while the storing unit stores the flooding command, information of the failure port from port data indicating relationship between the transmission-destination address and a plurality of ports of the packet transmission device; and
   a packet transmitting unit that transmits, before the deleting unit completes deletion of the information of the failure port, the received packet from all of the ports according to the flooding command stored in the storing unit, and that transmits, after the deleting unit completes the deletion, the received packet from one of the ports according to the port data.

2. A packet transmission device according to claim 1, further comprising a correcting unit that changes a port corresponding to the transmission-destination address from the port of the communication line in which the failure has been detected to a port from which a packet having a same source address as the transmission-destination address is received.

3. The packet transmission device according to claim 1, wherein the packet transmitting unit transmits, when a port from which the received packet is to be sent is not clear, the received packet from all ports, regardless of presence of the flooding command in the storing unit.

4. A packet transmission method of transmitting a packet received via a plurality of communication lines, the packet transmission method comprising:
   detecting a failure in the communication lines by monitoring a condition of the communication lines;
   receiving a packet having a same transmission-destination address as an address corresponding to a failure port of a communication line in which the failure has been detected;
   generating, when the failure is detected in the communication line, a flooding command indicating that the received packet is to be sent from all the ports;
   storing the flooding command;
   starting, while the flooding command is stored, deletion of information of the failure port from port data indicating relationship between the transmission-destination address and a plurality of ports corresponding to the communication lines;
   transmitting, before the deletion completes, the received packet from all of the ports according to the flooding command stored; and
   transmitting, after the deletion completes, the received packet from one of the ports according to the port data.

5. A packet transmission method according to claim 4, further comprising changing a port corresponding to the transmission-destination address from the port of the communication line in which the failure has been detected to a port from which a packet having a same source address as the transmission-destination address is received.

6. The packet transmission method according to claim 4, wherein the transmitting includes transmitting, when a port from which the received packet is to be sent is not clear, the received packet from all ports, regardless of presence of the flooding command stored.

* * * * *